United States Patent Office
3,608,173
Patented Sept. 28, 1971

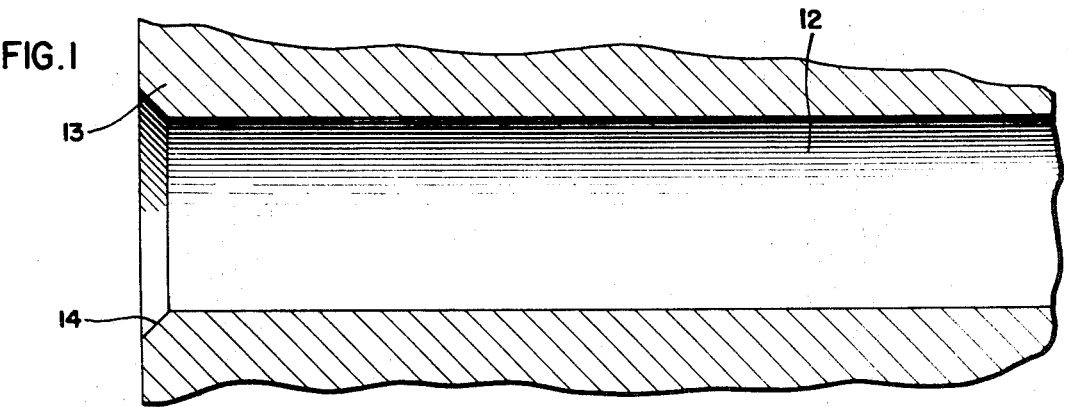
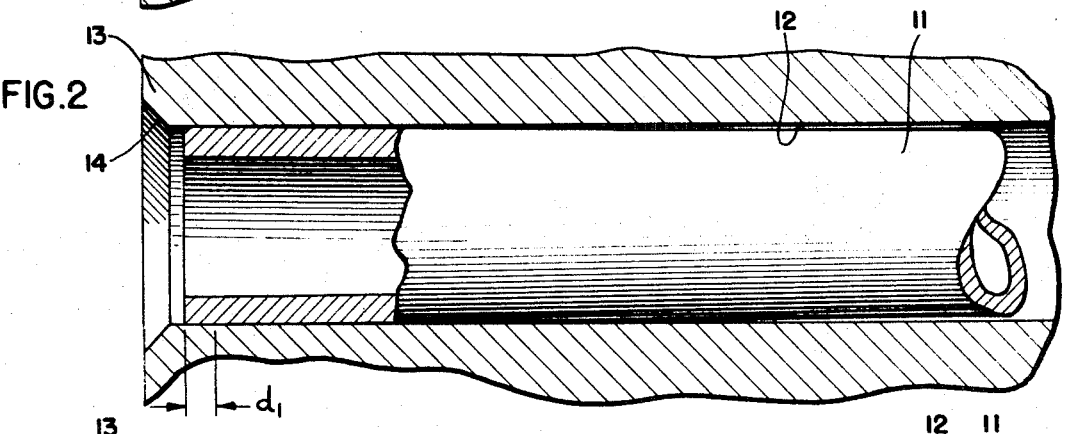
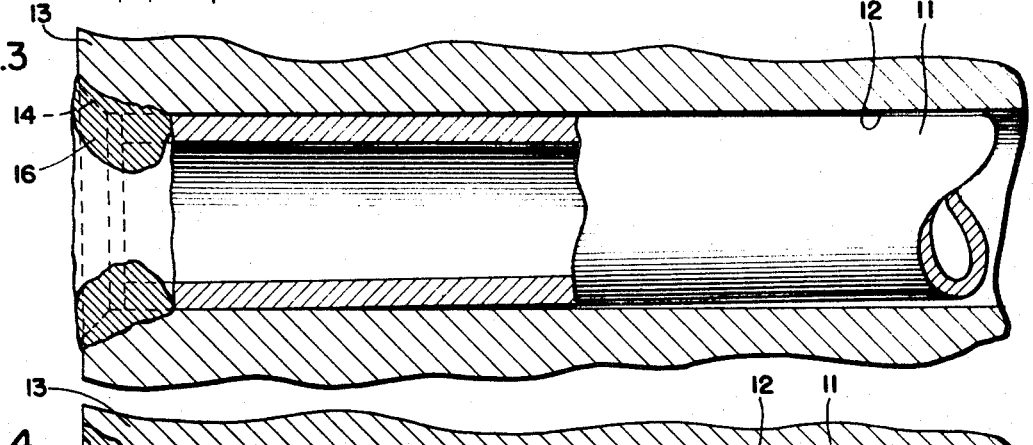
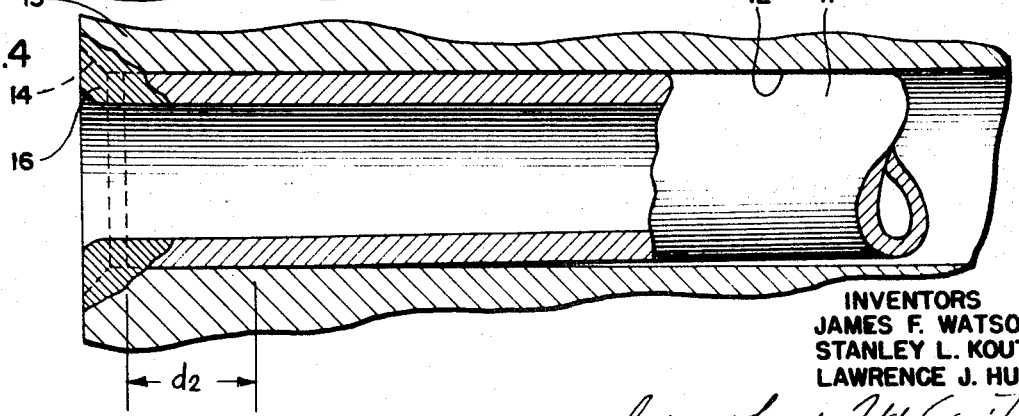

3,608,173
METHOD FOR SECURING A TUBE IN A TUBESHEET
James F. Watson, La Jolla, and Stanley L. Koutz and Lawrence J. Hull, San Diego, Calif., assignors to Gulf Energy & Environmental Systems, Inc., San Diego, Calif.
Filed Nov. 19, 1968, Ser. No. 777,036
Int. Cl. B21d *53/00;* B21k *29/00;* B23p *15/26*
U.S. Cl. 29—157.4
2 Claims

ABSTRACT OF THE DISCLOSURE

A method is described for securing a tube in a tube sheet. The tube is inserted in a hole in the tube sheet and is expanded with a taper into contact with the tube sheet. The tube is then bonded to the tube sheet at its end and is further expanded with a taper subsequent to bonding.

---

This invention relates generally to steam generators, condensers, heat exchangers, and similar apparatus. More particularly, the invention relates to a method for securing a tube in a tube sheet in such apparatus.

Steam generators, condensers, heat exchangers and similar types of apparatus sometimes incorporate a tube sheet. Generally, a tube sheet comprises a flat or curved wall which may face on or define a chamber. The tube sheet has a plurality of holes therein for accommodating a corresponding plurality of heat exchanger tubes. The tubes communicate with the chamber to pass fluid into the chamber or carry fluid from the chamber, depending upon the particular use for the apparatus.

In high temperature environments, such as are typically found in the generation of steam, stress corrosion may occur at various regions of localized tensile stress in the tubes. Such regions of localized tensile stress may be produced in joining the tubes to the tube sheet. Regions of localized tensile stress may also be susceptible to stress corrosion at lower temperatures in the presence of substantial concentrations of corrodents.

Heretofore, one generally used method of securing tubes to a tube sheet included inserting the tube into a hole in the tube sheet and welding the tube and the tube sheet together at the end of the tube. The tube and tube sheet are then rolled by means of a roll inserted into the end of the tube to expand the tube slightly within the hole in the tube sheet. Tube sheet connections so made frequently encounter stress corrosion cracks at the weld, adjacent the weld, or adjacent each end of the rolled areas.

It is an object of this invention to provide an improved method for securing a tube in a tube sheet.

Another object of the invention is to provide a method for securing a tube in a tube sheet by which stress corrosion is minimized.

A further object of the invention is to provide a method for securing a tube in a tube sheet by which stress corrosion is minimized and which is relatively simple to accomplish.

Other objects of the invention will become apparent to those skilled in the art from the following description taken in connection with the accompanying drawings wherein FIGS. 1 through 4 depict successive steps in practicing the method of the invention.

Very generally, the method of the invention comprises inserting the tube 11 in a hole 12 in the tube sheet 13. A taper is produced in the tube to expand the tube into contact with the tube sheet for a distance $d_1$ extending from the end of the tube and equal to approximately one-half to one time the tube wall thickness. The tube is then bonded to the tube sheet at its end. The taper of the tube is further expanded to increase the distance $d_2$ of contact between the tube and the tube sheet to a minimum of about twice the tube wall thickness.

Referring now more particularly to the drawings, a portion of a tube sheet 13 is shown having a cylindrical opening or hole 12 bored therein. The tube sheet may be of any satisfactory heat and corrosion resistant material such as various carbon steel, iron-nickel, iron-chromium, and iron-chromium-nickel alloys, and may, in some cases, be quite thick (e.g. eighteen inches). The end of the hole 12 is provided with a 45° chamfer 14 to a depth about equal to the wall thickness of the tube which is to be attached in the tube sheet. Thus, for example, a 45° chamfer to a depth of about ⅛″ may be provided where a ¾″ OD tube having a 0.120″ wall thickness is used.

In accordance with the method of the invention, the cylindrical tube 11 which is to be secured to the tube sheet 13 is inserted in the cylindrical hole 12. The diameter of the hole 12 is preferably slightly larger than the diameter of the tube 11 and may, for example, be about 0.76″ diameter when a 0.75″ diameter tube is used. The tube is positioned so that its end is flush with the chamfer 14 or a slight distance therefrom. For example, satisfactory results may be achieved utilizing a ¾″ OD tube positioned flush to 1/32″ from the inner corner of the chamfer. In a situation where a chamfer is not utilized, the 0 to 1/32″ tolerance may be maintained from the surface of the tube sheet.

After the tube is positioned as above described, a taper is produced in the end of the tube 11 to expand the tube into contact with the tube sheet. The taper may be produced by utilizing a tapered roll or a hardened drift pin to provide a smooth transition between the rolled and unrolled area of the tube. An abrupt sharp transition at the inner end of the roll should be avoided. The amount of tube expansion by tapered roll expander may be controlled by adjusting the thrust collar or by measuring the mandrel travel of the tapered roll expander. By presetting the collar of the tool to obtain a desired expansion for the tube ID, consistent and reproducible expansion of the tube may be achieved. Thrust collars on tapered roll tube expanders are generally provided to control roll depth and are machined to match the configuration and dimensions of the cage and roller pins in typical tube expanding apparatus. The leading edge of the thrus collar may be suitably machined to position the end of the tube 11 as desired with respect to the lower edge of the chamfered hole, that is, flush to 1/32″ in the example.

The tapered expansion of the tube is indicated in FIG. 2 and is carried out in a manner to provide tube-to-tube sheet contact over a distance of $d_1$ which extends from the end of the tube and is equal to approximately one-half to one times the tube wall thickness. Thus, for a tube having a wall thickness of about ⅛″, the distance $d_1$ may be about 1/16″ to ⅛″. It is usually sufficient if metal-to-metal contact between the tube and the tube sheet is provided an inward distance which is about equal to the depth of the subsequent bond to be made between the tube and the tube sheet. In the case of welding, this bond depth is equal to or greater than the tube wall thickness in the region of the bond. Of course, the rolling operation will effect some decrease in the tube wall thickness in the rolled region, but this decrease in thickness is typically only about 5% or less and may therefore usually be ignored. In the case of soldering or brazing, the depth of the bond, that is, the distance the bond extends along the tube, is typically at least equal to about five times the tube wall thickness.

After expansion of the tube 11 as described in connection with FIG. 2, the tube is bonded to the tube sheet 13. Bonding may be effected by any suitable means, such as welding, soldering or brazing. In FIG. 3, the illustrated method of bonding is by welding, the welded region being generally annular and indicated at 16. The original outlines of the tube 11 and the chamfer 14, although fused into the welded region 16, are indicated by dotted lines. The welding material may be of any suitable type. The same or similar alloys may be used in the weld filler metal as are used in the tube or tube sheet. For tubes of $\frac{3}{4}''$ outer diameter and $\frac{1}{8}''$ thick walls, typical welding electrode diameters may be in the neighborhood of $\frac{3}{32}''$ to $\frac{1}{8}''$.

As previously mentioned, other types of bonding may be utilized, such as soldering or brazing. In soldering or brazing the tube 11 to the tube sheet 13, it may be desirable to place a sleeve of bonding material between the tube and the tube sheet prior to the first enlarging step illustrated in FIG. 2. The length of this bonding material sleeve may be about equal to or slightly greater than the depth of the bond and is typically at least equal to about five times the tube wall thickness.

In the event there is not an excess of material around the bond joint, the subsequently described further expanding operation may be proceeded to directly. On the other hand, in the case of some types of bonding, there may be an excess of filler material around the bond joint. This is illustrated in FIG. 3 in the region 16. In accordance with the invention, the excess filler material is removed with a suitable tool in order to blend the filler material with the tube taper. In addition, any excess of filler material beyond the face of the tube sheet 13 is also removed to bring the face of the tube sheet 13 at the bond into coincidence with its original position.

After bonding and, if necessary, after excess filler material has been removed as described above, the taper of the tube 11 is further expanded to increase the distance of contact between the tube and the tube sheet to the distance $d_2$ indicated in FIG. 4. The distance $d_2$ is a minimum of twice the tube wall thickness. This further expansion is of a configuration which provides a smooth transition between the rolled and unrolled area of the tube and is preferably effected by means of a tapered roll in a manner similar to the production of the initial taper in the tube.

Further rolling helps in preventing tube-to-tube sheet separation and, where performed as described, minimizes localized regions of excessive tensile stress in the tube and the tube joint. In fact, the typical result of the method of the invention is to leave only compressive stresses on the inside of the tube and over its end. Since the outer surface of the tube opposite the compressively stressed regions is in tensile stress, the method of the invention is not recommended for use in conditions where the outer surface of the tube is exposed to corrodents. The method of the invention as described above effects a substantial improvement over heretofore known methods of tube-to-tube sheet joining. In particular, heat or corrosion resistant materials which are subject to stress corrosion, such as austenitic stainless steels, brass, and aluminum alloys, when fabricated in accordance with the method of the invention, are typically free from substantial stress corrosion attack. The method of the invention is relatively simple to perform and is therefore not significantly more costly than previously known methods.

The following table provides some examples of tube-to-tube sheet joints constructed in accordance with the invention. In each case, the effects of stress corrosion are substantially reduced over similar tube-to-tube sheet junctions constructed in accordance with previously known methods.

| Tube sheet material | Tube material | Weld material | Tube size | Hole clearance | $d_1$ | $d_2$ |
|---|---|---|---|---|---|---|
| Inconel 600 | 304 Stainless | Inconel 182 | $\frac{3}{4}''$ x .120 | .011 | .125 | .250 |
| Do | do | do | $\frac{3}{4}''$ x .120 | .006 | .087 | .250 |
| Do | do | do | $\frac{3}{4}''$ x .120 | .014 | .125 | .500 |

Various modifications of the invention in addition to those shown and described herein will become apparent to those skilled in the art from the foregoing description and accompanying drawings. Such other modifications are intended to fall within the scope of the appended claims.

What is claimed is:

1. A method of producing a stress corrosion resistant joint between one end of a cylindrical tube of a heat and corrosion resistant material and a tube sheet of a heat and corrosion resistant material having a cylindrical hole therethrough of a diameter sufficient to accommodate the outer diameter of the tube, said method comprising the steps of: providing a chamfer in said tube sheet at one end of said cylindrical hole to provide an inner smaller diameter corner at said cylindrical hole and an outer corner at the outer wall of said tube sheet, inserting the tube into the hole in the tube sheet and substantially aligning the one end of said tube with said inner corner of said chamfer, taper expanding the tube radially outward into contact with the tube sheet from the first end thereof for a distance approximately one-half to one times the tube wall thickness, forming a smooth transition between the tapered expanded and cylindrical portions of the tube internal wall to avoid producing shoulders and tensile stressed areas on the inner surface of the tube; welding the tube to the tube sheet at said one end of said tube and at said chamfer; removing excess metal from the inner surface of said tube and from said weld; and subsequent to welding, taper expanding said previously tapered portion to increase the distance of contact between the tube and tube sheet to a minimum of twice the tube wall thickness to stress relieve the previously tapered wall portion of said tube; and forming a smooth transition between the tapered and cylindrical portions of the tube inner wall to avoid producing tensile stressed areas on the inner surface of the tube which areas are subject to stress corrosion cracking.

2. A method according to claim 1 wherein both expanding steps are accomplished by taper rolling.

References Cited

UNITED STATES PATENTS

| 2,678,224 | 5/1954 | Kooistra | 29—157.4X |
| 3,120,400 | 2/1964 | Carpenter | 29—157.4X |
| 3,349,465 | 10/1967 | La Pan et al. | 29—157.4X |
| 3,449,812 | 6/1969 | Hauschke et al. | 29—157.4 |

FOREIGN PATENTS 713,054   8/1954   Great Britain.

JOHN F. CAMPBELL, Primary Examiner

V. A. DI PALMA, Assistant Examiner

U.S. Cl. X.R.

29—471.1, 480, 482

UNITED STATES PATENT OFFICE
CERTIFICATE OF CORRECTION

Patent No. 3,608,173　　　　　　　　　Dated September 28, 1971

Inventor(s) J. F. Watson et al.

It is certified that error appears in the above-identified patent and that said Letters Patent are hereby corrected as shown below:

Column 1, lines 5-7 - for "assignors to Gulf Energy &

Environmental Systems, Inc., San Diego, Calif.", read "Gulf Oil Corporation, San Diego, Calif.".

Signed and sealed this 13th day of June 1972.

(SEAL)
Attest:

EDWARD M. FLETCHER, JR.　　　　　　　ROBERT GOTTSCHALK
Attesting Officer　　　　　　　　　　Commissioner of Patents